June 8, 1965
J. D. SCOTT
3,188,528
ELECTROMAGNET VOLTAGE COMPENSATOR CONTROL CIRCUIT
Filed Feb. 9, 1962
2 Sheets-Sheet 1
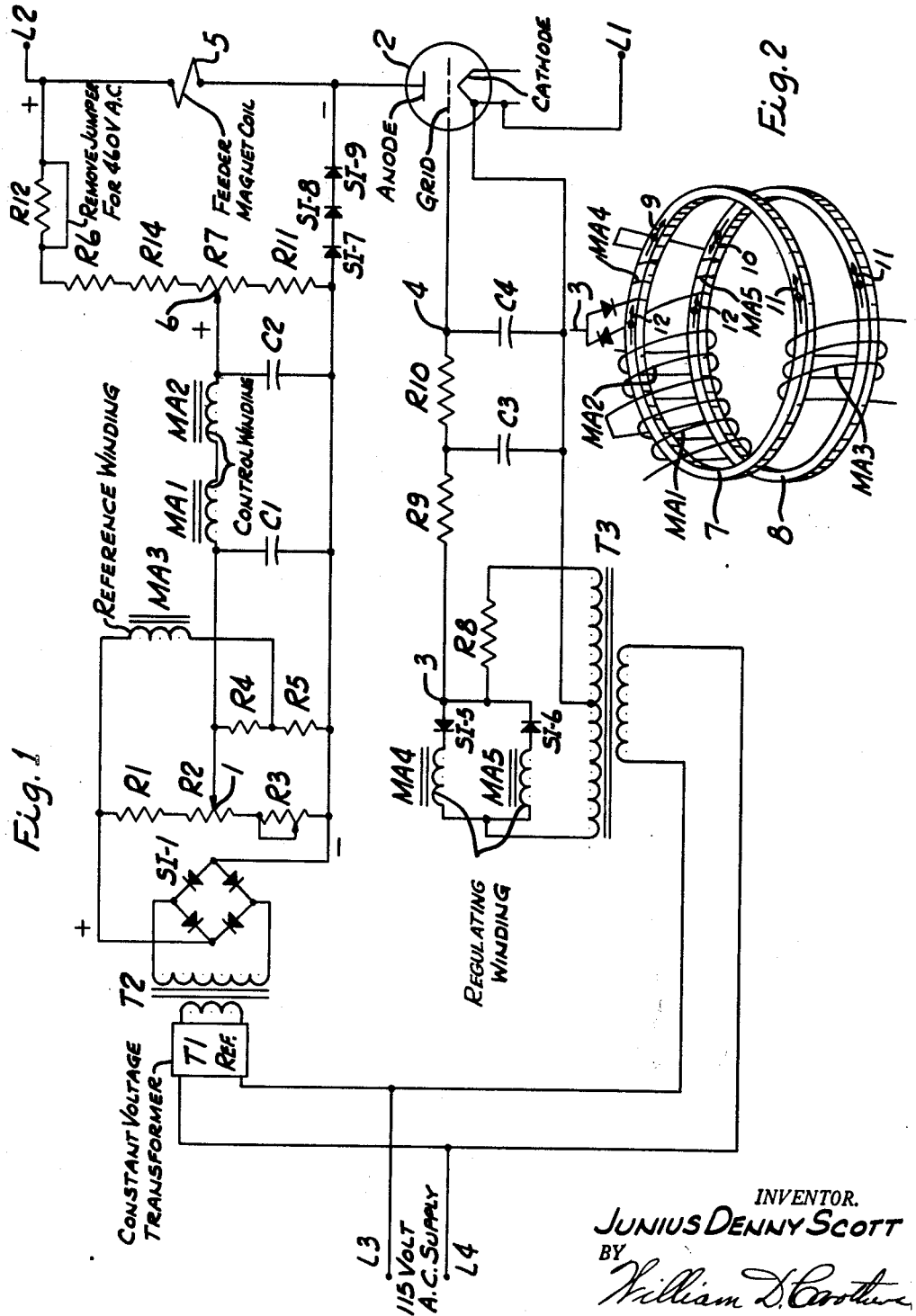
INVENTOR.
JUNIUS DENNY SCOTT
BY
*William D. Carothers*
HIS ATTORNEY INVENTOR.
JUNIUS DENNY SCOTT
BY William D. Carothers
HIS ATTORNEY United States Patent Office
3,188,528
Patented June 8, 1965

3,188,528
ELECTROMAGNET VOLTAGE COMPENSATOR CONTROL CIRCUIT
Junius Denny Scott, Homer City, Pa., assignor, by mesne assignments, to Link-Belt Company, Chicago, Ill., a corporation of Illinois
Filed Feb. 9, 1962, Ser. No. 172,196
17 Claims. (Cl. 317—149)

This invention relates generally to current impulse controllers for governing the magnitude and time between current impulses in an operating circuit and to automatically compensate for changes in voltage supplying said operating circuits.

In many installations of electromagnet controls for the operation of a vibratory means the amplitude as well as the time between current impulses determines the ultimate operation of the means. If the supply voltage changes, a constantly operating vibratory device is greatly affected. Again if the vibratory load changes it also greatly affects the operating results of the vibratory device. A change in load even varies the effective operation of the device by changing the reluctance of the operating coil in the circuit which may have a similar effect as a change in voltage.

The principal object of this invention is the provision of a control circuit which compensates for variations in impedance of an operating circuit which may be reflected as a change in voltage across the operating coil or due to an actual change in voltage across the operating coil, which changes are automatically compensated for to maintain as near as possible a constant operation of the device.

This automatic compensation for voltage may be produced by an actual increase in voltage across the operating coil or it may be produced by increasing or decreasing the time of the energy impulses which is in effect equivalent to increasing or decreasing the voltage across the operating coil.

Other objects and advantages appear hereinafter in the following description and claims.

The accompanying drawings show for the purpose of exemplification without limiting this invention or the claims thereto, certain practical embodiments illustrating the principles of this invention wherein:

FIG. 1 is a circuit diagram employing a full wave rectifier in the constant or reference voltage supply.

FIG. 2 is a diagrammatic view of the magnetic amplifier employed in this invention.

Figure 3:
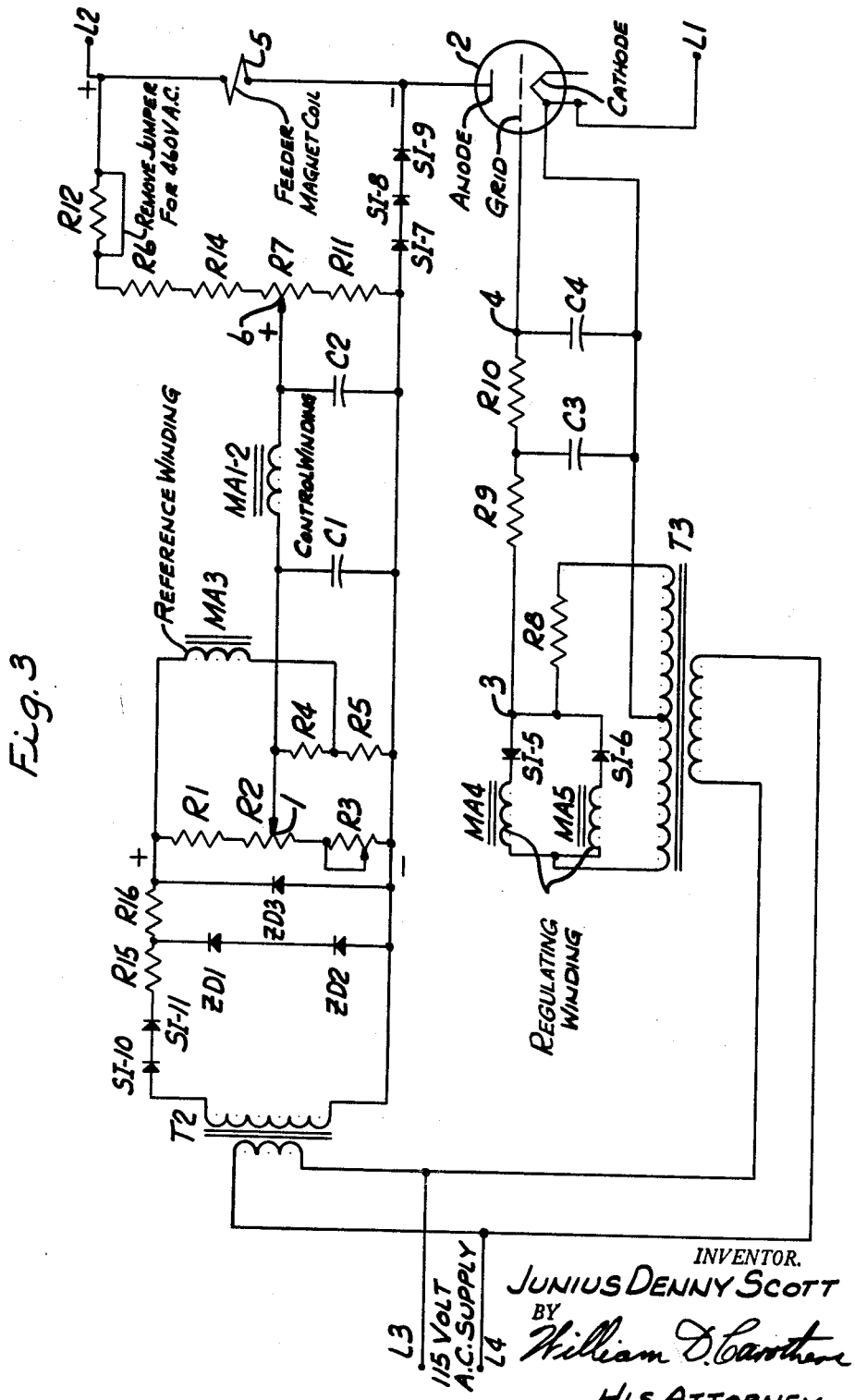
FIG. 3 is a diagrammatic view of the circuit comprising the invention employing a single or half-wave rectifier and two stages of Zener diodes as voltage regulators comprising the reference voltage supply.

Referring to FIG. 1 of the drawing L1 and L2 represent one source of alternating current voltage supply and L3 and L4 represent a second source eof alternating current voltage supply. These sources of alternating current voltage supply may of course be the same or they may be of different voltage or even different frequencies. Generally speaking, the alternating current voltage supply L3, L4 would be a 115 volt A.C. supply circuit whereas L1, L2 might be an alternating current of a higher voltage. In any event the 115 volt A.C. supply serves the constant voltage transformer T1 which may be of the Raytheon or Sola type which provides a constant voltage output to the primary of the transformer T2 a secondary of which supplies the bridge connected rectifier SI-1 and its intermediate alternating supply points the positive end of the bridge being connected directly to one end of the voltage divider represented by the resistances R1, R2, and R3 connected in series in the order stated from the positive to the negative side of the pulsating current supplied by the rectifier SI-1. The positive terminal of the bridge rectifier is also connected to one side of the coil MA3 which is a reference coil of the magnetic amplifier shown in FIG. 2. The other side of this reference coil is connected intermediate of the resistances R4 and R5 the latter of which is connected to the negative line of the rectifier SI-1 and the opposite end of the resistor R4 is connected to the variable arm 1 of the resistance R2 which line is also connected to one end of the control winding coils represented by the two coils MA1 and MA2 connected in series. The reference voltage supplied from the transformer T2 as a constant reference voltage is filtered by the condenser C1 which represents the end of constant voltage reference circuit.

The supply lines L3, L4, of the 115 alternating coil supply, also supply current to the primary transformer T3 the secondary of which has a midtap connected to the cathode of the tube 2, this cathode is also connected to one side of the alternating current supply L1. Opposite ends of the secondary of the transformer T3 are connected to a closed circuit including the resistor R8 in series with the regulating windings of the magnetic amplifier indicated as MA4 and MA5 each of which has a rectifier SI-5 and SI-6 respectively in series with regulating windings and respective rectifiers are connected in multiple with each other and in series with the resistance R8 across the secondary of the transformer T3. The rectifier SI-5 is disposed in a direction opposite to the rectifier SI-6 and the voltage intermediate this parallel circuit and a resistance R8 is connected by the line 3 to the resistors R9 and R10 in series and thence through the line 4 to the grid of the tube 2. Thus the rectifier SI-5 will allow the passage of a half-wave of the alternating current voltage through the regulating winding MA4 to the left end of the secondary of the transformer 13 whereas the rectifier SI-6 will allow the passage of current in the opposite direction from the left end of the secondary of the transformer T3 and to the resistors R9 and R10 and grid of the tube 2. The alternating current voltage will appear across resistor R8.

To filter this grid biasing circuit condenser C3 is connected to thet cathode and intermediate the resistors R9, R10 (and the condenser C3 and the condenser C4 is connected to the cathode and the line 4 or grid of the tube 2. Thus the 115 volt A.C. supply provides a grid bias for the tube 2 which causes the tube to fire each positive cycle the alternating current supply. When the grid fires the anode voltage is supplied to the one end of the feeder magnet coil 5 the other end of which is connected to the line L2 the alternating current supply.

The opposite sides of the feeder magnet coil 5 are connected to the voltage divider circuit represented by the resistances R12, R6, R14, R7, and R11 which connects the line L2 on one side to the negative line of the bridge rectifier on the constant voltage reference circuit. This point is likewise connected through the series of rectifiers SI-7, SI-8, and SI-9 to the anode of the tube 2 thereby completing the divider voltage circuit in multiple with the feeder magnet coil 5.

The variable arm 6 is a variable connection to the resistances R7 of the divider circuit and is connected to one side of the control winding MA2 and the condenser C2 this completes the circuit.

The regulating windings MA4 and MA5 are illustrated in FIG. 2 as independent windings around each of the respective cores 7 and 8 of the magnetic amplifier shown in FIG. 2. These windings are wound and connected so as to produce a flux as indicated at 9 and 10 in the rings 7 and 8 respectively which path of flux are in opposite directions in the rings and have the effect of cancelling the flow of flux in their respective rings.

The reference winding MA3 is wound about both of said rings 7 and 8 so as to produce a flux 11 in both of said rings 7 and 8 as shown in FIG. 2.

The control winding MA1, MA2 are also wound around both rings 7 and 8 to produce the flux as indicated at 12 in each of the rings 7 and 8. Although the coils MA1 and MA2 are shown separately in the circuit diagram of FIG. 1 they actually represent the center between the voltage divider circuits on the reference as well as on the control side represented by the reference side from the transformer T2 and the feeder magnet coil 5 on the control winding side of the circuit. However, for all practical purposes these control windings may be considered as one winding as illustrated in FIG. 2.

A suitable A.C. reference voltage is produced by the constant voltage device T1 and the output voltage is constant over an anticipated line voltage variation. This constant voltage is, of course, rectified by the bridge rectifier SI-1 and the output is impressed across the voltage divider network filtered by the condenser C1.

The voltage across the feeder magnet coil 5 is also rectified and applied to its voltage divider network and this pulsating voltage is essentially an alternating coil voltage even though it has been rectified by the thyratron tube 2 due to the high inductive characteristic of the feeder magnet coil 5 the positive half of this alternating coil wave form is rectified by the rectifier SI-7, SI-8, and SI-9 and this pulsating D.C. voltage is impressed across its voltage divider network and filtered by the condenser C2. This condenser also compensates for form factor changes in the impressed wave form due to the firing angles of the thyratron tube 2.

The D.C. voltage from the constant voltage reference appearing across the condenser C1 is then compared with the rectifier voltage from the feeder magnet coil 5 appearing across condenser C2. If the these voltages are equal no current will flow through the amplifier control windings MA1 and MA2. However, if a line voltage variation should cause the feeder magnet coil 5 to have a reduced voltage the D.C. voltage across C2 would drop below the value of the D.C. voltage appearing across C1. This unbalanced voltage results in current flow through the magnetic amplifier control windings in MA1 and MA2 in such a direction as to drive the magnetic amplifier towards saturation. Driving the magnetic amplifier towards saturation results in the power output windings saturating at a lower value of voltage and at a time which occurs earlier in the cycle. This corrected wave form is fed to the grid of the thyratron 2 and causes the thyratron to fire earlier in the cycle, thereby increasing the voltage to the feeder magnet coil 5.

Conversely if the line voltage variation should cause the voltage across the feeder magnet coil 5 to increase the voltage across the condenser C2 and increase above that value of direct current voltage which appears across the condenser C1, this would result in current flowing in the opposite direction through the magnetic amplifier control windings MA1 and MA2 driving the magnetic amplifier saturation point opposite from that of a saturated condition. The power output windings or regulator windings MA4 and MA5 now saturate at a higher value of voltage, and at a time which would occur later in the cycle. This will cause the thyratron 2 to fire later in the cycle, resulting in a lower value of voltage across the magnet coil.

Thus any deviation from the set point of operation or balance by the voltage of the opposing voltage dividers would result in a correction action to restore the proper voltage across the feeder magnet coil 5 to its true set value and provide constant operation of the device.

The desired voltage across the feeder magnet coil 5 is set by positioning the arm 1 of resistance R2. This setting determines the voltage of the reference winding MA3 of the magnetic amplifier. This reference winding is connected in such a manner that normal current flow through the winding drives the magnetic amplifier away from the saturation point, and therefore tends to effect a lowering of the voltage across the feeder magnet coil 5. As the arm R1 of the potentiometer R2 is moved towards R1 the voltage across R5 increases which results in a lower voltage across a magnetic amplifier reference winding MA3 tending to increase the voltage across the feeder magnet coil 5.

Thus as arm 1 is moved towards resistance R1 of arm 1 the reference winding coil through MA3 increases the voltage across the reference feeder magnet coil 5 and at the same time also raises the D.C. voltage across C1 causing current flow through the control windings MA1 and MA2 in such a direction as to add the effect of the reference winding MA3. It follows then that as the arm 1 of resistance R2 is lowered toward the resistance R3 the converse will result and lower the voltage across the feeder magnet coil 5.

The resistances R1 and R3 are chosen to be of suitable value to obtain the desired range of control across R2. The resistances R4 and R5 are selected to obtain the desired proportion of current through the reference winding MA3, the magnetic amplifier.

The power output or regulating windings MA4 and MA5 whether they be two or a single winding are connected as previously described in a self-saturating circuit, using the resistance R8 as the load resistor. The grid wave form is obtained between the center tap of the secondary of the transformer T3 and the connection 3 with the resistor R8 and the self-saturating rectifiers SI-5 and SI-6.

The grid wave form is fed through the low frequency pass type filter network including the grid resistors R9 and R10 and the condensers C3 and C4. This filter network is divided to filter out unwanted transients, preventing them from reaching the grid tube and resulting in erratic operation.

In the structure of FIG. 3 the circuit is substantially the same with the exception that the bridge rectifier has been replaced by the rectifiers SI-10 and SI-11 which supply positive current to the resistor R15 and R16 to one side of the reference coil MA3. The constant voltage transformer T1 has been replaced by Zener diodes as illustrated in FIG. 3. These variations together with the combining of the coils MA1 and MA2 as a single coil, MA1-2, provide a circuit that operates in the same manner to produce the same result.

The half wave rectifiers SI-10 and SI-11 are connected from one side of the transformer secondary of T2 and in series with the resistances R15 and R16 and thence to the positive bus of the divider circuit and to one end of the reference winding MA3. The other side of the transformer secondary winding T2 is connected to the negative side of both voltage divider circuits and to the negative bus of the rectifiers SI-7, SI-8, and SI-9. Two Zener diodes ZD1 and ZD2 are connected on one side to the negative bus and on the other side between the resistors R15 and R16 and the Zener diode ZD3 is connected from the negative bus to the positive bus or on the voltage divider side of the resistance R16 as shown in FIG. 3. This is a two stage Zener constant voltage circuit the first stage represented by the Zener diode ZD3 and the resistance R16 and the second stage represented by the Zener diodes ZD1 and ZD2 with the resistance R15. This first constant voltage stage may be sufficient without the second stage but the combination of both stages provides for greater accuracy. The use of the single or half wave rectifiers SI-10 and SI-11 is optional for use in FIGS. 1 or 3. The full wave bridge may in some instances be preferred in FIG. 3 in combination with the Zener diodes to provide a constant voltage.

I claim:

1. An automatic compensator for an electromagnet consisting of an electromagnet operating coil, a thyratron having grid and plate circuits, said plate circuit connected to supply from an alternating current source the operating voltage to said coil, a magnetic amplifier having two magnetically coupled cores each with a regulating winding and connected to control the operation of said grid circuit, a reference winding and a control winding wound on both cores, a circuit connected to supply from an alternating current source a constant rectified voltage to said reference winding and to one side of said control winding, a circuit to rectify the voltage impressed on said operating coil and supply it to the other side of said control winding, the current flowing in opposite directions in said control winding driving said cores toward and away from saturation to respectively control the firing of said thyratron earlier and later in the cycle to compensate for lower and higher voltage impressed across said operating coil to maintain a constant operation of the electromagnet regardless of the non-linear operating characteristics of the electromagnet.

2. The automatic compensation circuit of claim 1 in that said supply of the rectified constant voltage and said supply of the rectified voltage impressed on said operating coil to the opposite sides of said control winding of the same phase and frequency and are each positive.

3. The automatic compensation circuit of claim 1 in that said regulating winding connection includes a multiple self-saturating circuit having a rectifier in series with each regulating winding to pass alternate halves of the alternating current cycle supplied thereto through a load, the grid connection being made from between the load and multiple circuit through a filter network.

4. The automatic compensator circuit of claim 1 in that said circuit connected to supply a rectified constant voltage includes a bridge type rectifier.

5. The automatic compensator circuit of claim 1 in that said circuit connected to supply a rectified constant voltage includes a half wave single leg rectifier.

6. The automatic compensator circuit of claim 1 in that the circuit to supply rectified voltage on opposite sides of the control winding includes a voltage divider circuit for each voltage source and a filter condenser connected to each side of said control winding, said reference winding and selected resistances connected as a bridge in multiple with said voltage divider circuit fed by said constant rectified voltage.

7. The automatic compensator circuit of claim 6 in that the connection from each side of said control winding is adjustably connected to said voltage dividers to vary the respective voltages to provide the proper range of control over said electromagnetic operating coil.

8. The automatic compensator circuit of claim 1 in that said control winding is in two parts to center the junction of control between the voltages on each side thereof.

9. The automatic compensation circuit of claim 1 in that said supply of rectified constant voltage includes a constant voltage transformer and a rectifier connected to supply rectified voltage to said reference winding and to one side of said control winding.

10. The automatic compensation circuit of claim 1 in that said supply of rectified constant voltage includes a rectifier connected for delivering rectified voltage to said reference winding and to one side of said control winding, a single Zener diode stage connected in multiple with said rectified voltage, and a Zener stage resistance connected between the positive side of the rectifier supplying said rectified voltage and the positive side of said Zener diode.

11. The automatic compensator circuit of claim 10 in that a second Zener diode stage including a second Zener stage resistance connected on the voltage source side and in series with said first Zener stage resistance; and two Zener diodes connected in series and from the negative side of said supply of rectified constant voltage to between said first and second Zener stage resistances.

12. The automatic compensator circuit of claim 11 in that said source of rectified constant voltage is produced by a half wave producing series diode connection.

13. The automatic compensator circuit of claim 11 in that said source of rectified constant voltage is produced by a full wave producing bridge connected diode.

14. An automatic compensator for an electromagnet consisting of an electromagnet operating coil, a controllable half wave rectifying device connected in series with said operating coil both of which are connected across the alternating current supply to energize the operating coil, a magnetic amplifier having regulating winding means and reference winding means and control winding means, said regulating winding means connected to vary the control of the half wave rectifying device, a source means of constant direct current voltage, said reference winding means supplied with a constant direct current voltage to determine the degree of saturation in the magnetic amplifier, a second source means of direct current voltage supplied from a parallel connection with said operating coil to reflect voltage changes thereacross, said control winding means having one end connected to said constant source means of direct current and its other end connected to said second source means of direct current to maintain a constant operating characteristic of said electromagnet regardless of the non-linear characteristics of said electromagnet.

15. The automatic compensator of claim 14 wherein the source means of constant direct current voltage is by half wave rectifiers connected to an alternating current source.

16. The automatic compensator of claim 14 wherein the source means of constant direct current voltage is full wave rectifiers connected to an alternating current source.

17. The automatic compensator of claim 14 wherein the source means of constant direct current voltage is by use of half wave rectifiers connected to one side of an alternating current source and in series with a first and a second resistance, one stage with two Zener diodes in series connected to the other side of said alternating current source with the second Zener diode connected to between said last named first and second resistors, and another stage with one Zener diode connected to the other side of said second resistance.

References Cited by the Examiner

UNITED STATES PATENTS

| | | | |
|---|---|---|---|
| 2,213,882 | 9/40 | Ludbrook | 321—25 X |
| 2,722,654 | 11/55 | Sikorra | 323—4 |
| 2,885,617 | 5/59 | Kast et al. | 323—89 X |
| 3,087,107 | 4/63 | Hunter et al. | 321—25 X |

MAX L. LEVY, *Primary Examiner.*

SAMUEL BERNSTEIN, *Examiner.*